(12) United States Patent
Shima

(10) Patent No.: US 11,169,240 B1
(45) Date of Patent: Nov. 9, 2021

(54) SYSTEMS AND METHODS FOR DETERMINING AN ANGLE OF ARRIVAL OF A SIGNAL AT A PLANAR ARRAY ANTENNA

(71) Applicant: Ball Aerospace & Technologies Corp., Boulder, CO (US)

(72) Inventor: James M. Shima, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 42 days.

(21) Appl. No.: 16/700,334

(22) Filed: Dec. 2, 2019

Related U.S. Application Data

(60) Provisional application No. 62/773,833, filed on Nov. 30, 2018.

(51) Int. Cl.
*G01S 3/48* (2006.01)
*H01Q 3/24* (2006.01)
*G01S 3/04* (2006.01)

(52) U.S. Cl.
CPC .............. *G01S 3/48* (2013.01); *G01S 3/043* (2013.01); *H01Q 3/24* (2013.01)

(58) Field of Classification Search
CPC .............. G01S 3/48; G01S 3/043; H01Q 3/24
USPC .................. 342/370, 417, 424, 442
See application file for complete search history.

(56) References Cited

U.S. PATENT DOCUMENTS

| 7,098,848 | B2 | 8/2006 | Ksienski et al. |
|---|---|---|---|
| 2001/0029185 | A1 | 10/2001 | Hildebrand et al. |
| 2002/0067315 | A1 | 6/2002 | Kunysz |
| 2002/0126042 | A1 | 9/2002 | Chang et al. |
| 2002/0175859 | A1 | 11/2002 | Newberg et al. |
| 2002/0180639 | A1 | 12/2002 | Rickett et al. |
| 2003/0020666 | A1 | 1/2003 | Wright |
| 2003/0161261 | A1 | 8/2003 | Weis |
| 2003/0206132 | A1 | 11/2003 | Phelan et al. |
| 2003/0236096 | A1 | 12/2003 | Yamazaki |
| 2004/0085933 | A1 | 5/2004 | Wang |
| 2005/0099354 | A1 | 5/2005 | Durham et al. |
| 2005/0099356 | A1 | 5/2005 | Durham et al. |
| 2005/0146476 | A1 | 7/2005 | Wang et al. |

(Continued)

FOREIGN PATENT DOCUMENTS

EP 3443704 7/2019

*Primary Examiner* — Bo Fan
(74) *Attorney, Agent, or Firm* — Sheridan Ross P.C.

(57) ABSTRACT

Systems and method for determining an angle of arrival of a radio frequency (RF) signal are disclosed. A radio frequency receiving system as disclosed herein can include a plurality of antenna or receiving elements formed on a common plane. A spacing between the receiving elements can be arbitrary. In response to receiving a radio frequency signal, a difference in an integer number of wavelengths that have passed and a difference in a phase of the received signal is determined between each of a plurality of pairs of antenna elements. More particularly, a residual error is calculated for each possible difference in the number of integer wavelengths that can occur as the received signal travels to the elements in each pair of elements. A solution with a minimum residual value is taken as the difference in the actual integer number of wavelengths that have been traversed by the received signal. That integer value and the detected phase difference is applied to determine the angle of arrival.

20 Claims, 4 Drawing Sheets

(56) References Cited

U.S. PATENT DOCUMENTS

| | | |
|---|---|---|
| 2005/0164744 A1 | 7/2005 | du Toit |
| 2005/0285785 A1 | 12/2005 | Martin et al. |
| 2006/0114164 A1 | 6/2006 | Iluz et al. |
| 2006/0145921 A1 | 7/2006 | Ranta et al. |
| 2007/0097006 A1 | 5/2007 | Brown et al. |
| 2007/0293150 A1 | 12/2007 | Ezal et al. |
| 2008/0117105 A1 | 5/2008 | Chen et al. |
| 2008/0278394 A1 | 11/2008 | Koh et al. |
| 2009/0002165 A1 | 1/2009 | Tuttle |
| 2009/0102704 A1 | 4/2009 | Fujimura |
| 2009/0167605 A1 | 7/2009 | Haskell |
| 2009/0189823 A1 | 7/2009 | Adamski |
| 2009/0273533 A1 | 11/2009 | Wolf et al. |
| 2010/0052975 A1 | 3/2010 | Milano et al. |
| 2010/0097290 A1 | 4/2010 | Legay et al. |
| 2010/0253574 A1 | 10/2010 | Mizutani et al. |
| 2011/0156694 A1 | 6/2011 | de Graauw |
| 2011/0285576 A1 | 11/2011 | Lynam |
| 2011/0309981 A1 | 12/2011 | Huizing |
| 2012/0280861 A1 | 11/2012 | Kishimoto et al. |
| 2013/0027250 A1 | 1/2013 | Chen |
| 2013/0099987 A1 | 4/2013 | Desclos et al. |
| 2013/0163705 A1 | 6/2013 | Stirland |
| 2014/0035694 A1 | 2/2014 | Narita et al. |
| 2014/0184454 A1 | 7/2014 | Shamblin et al. |
| 2014/0313073 A1 | 10/2014 | DiNallo et al. |
| 2015/0077290 A1* | 3/2015 | Veysoglu ............. H01Q 3/2605 342/371 |
| 2016/0021650 A1 | 1/2016 | Chembil-Palat et al. |
| 2016/0091601 A1 | 3/2016 | Karr |
| 2016/0226141 A1 | 8/2016 | Lee |
| 2016/0238699 A1* | 8/2016 | Ryba .................... B06B 1/0611 |
| 2017/0077576 A1* | 3/2017 | Kirino ...................... H01Q 3/32 |
| 2017/0223749 A1 | 8/2017 | Sheldon et al. |
| 2017/0293074 A1 | 10/2017 | Park et al. |
| 2017/0346195 A1 | 11/2017 | Yamamoto et al. |
| 2018/0013210 A1* | 1/2018 | Rosenkrantz .......... H01Q 3/267 |
| 2018/0038935 A1* | 2/2018 | Iizuka ...................... G01S 3/48 |
| 2018/0048382 A1 | 2/2018 | DiNallo et al. |
| 2018/0085091 A1* | 3/2018 | Hayashi ................. A61B 8/4405 |
| 2018/0108964 A1 | 4/2018 | Adas et al. |
| 2018/0115062 A1 | 4/2018 | Cummings et al. |
| 2018/0128910 A1 | 5/2018 | Lee |
| 2018/0192298 A1 | 7/2018 | Noerpel et al. |
| 2018/0246390 A1 | 8/2018 | Park et al. |
| 2018/0356705 A1 | 12/2018 | Park et al. |
| 2018/0375722 A1 | 12/2018 | Gohary et al. |
| 2019/0020107 A1 | 1/2019 | Polehn et al. |
| 2019/0237869 A1 | 8/2019 | Takahashi |
| 2019/0326664 A1 | 10/2019 | Zhu |
| 2019/0348761 A1 | 11/2019 | Miehle |
| 2019/0369200 A1* | 12/2019 | Finger ...................... G01S 3/02 |
| 2020/0309892 A1 | 10/2020 | Miers |

* cited by examiner

SYSTEMS AND METHODS FOR DETERMINING AN ANGLE OF ARRIVAL OF A SIGNAL AT A PLANAR ARRAY ANTENNA

CROSS-REFERENCE TO RELATED APPLICATIONS

This application claims the benefit of U.S. Provisional Patent Application Ser. No. 62/773,833, filed Nov. 30, 2018, the entire disclosure of which is hereby incorporated herein by reference.

FIELD

Systems and methods for determining the angle of arrival of incoming radio frequency electromagnetic waves at a planar array antenna are provided.

BACKGROUND

It is often desirable to determine an angle of arrival of an electromagnetic signal, such as a radio frequency (RF) signal, at a receiving antenna. For example, in a communication system, determining an angle of arrival can be used to point a beam toward a remote communication node in order to increase the signal to noise ratio (SNR) of communications. As another example, it can be important to detect the bearing towards the source of an interfering or hostile radar or jammer.

Conventional techniques for determining the angle of arrival of a radio frequency signal include receiving a signal at a one-dimensional, linear array. However, a one-dimensional array is unable to compute both azimuthal and elevation angle of the incoming signal. In addition, a one-dimensional linear array having a uniform spacing between elements suffers from a cone angle discrepancy. A two-dimensional array as can be used to determine both the azimuthal and elevation angle of an incoming radio frequency signal. However, determining the angle of arrival of a signal at a two-dimensional array requires a large number of computations and an exhaustive "search" in angle-angle space. Accordingly, the determination of an angle of arrival of a radio frequency signal at a planar two-dimensional array has required relatively large amounts of computational power and time. In addition, systems for determining an angle of arrival of an RF signal have required specific receive array geometries having uniform spacing between elements.

Accordingly, it would be desirable to provide systems and methods capable of efficiently determining an angle of arrival of RF energy at a receiver.

SUMMARY

Embodiments of the present disclosure are directed to systems and methods for determining an angle of arrival of RF energy, hereinafter referred to as an RF signal, at a receiving system that includes an antenna having a plurality of receiving or antenna elements. The array of antenna elements can be two-dimensional to provide both an azimuth angle and an elevation angle to the source of the received RF signal. Alternatively, the array can be one-dimensional to provide an azimuth angle to the source of a received RF signal. The spacing or interval between adjacent elements included in the array can be arbitrary. Moreover, the spacing between adjacent receiving elements can be uniform, or can be varied. In accordance with at least some embodiments of the present disclosure, the system includes a field programmable gate array (FPGA) or other processor that operates to determine the angle of arrival of the signal in azimuth and elevation using phase interferometry, and that further operates to provide an output comprising the determined angle of arrival. In accordance with further embodiments of the present disclosure, an output comprising a location of a signal source can be provided.

Methods in accordance with embodiments of the present disclosure can include receiving a radio frequency signal at multiple elements of an array antenna associated with a receiving system, and sensing a complex voltage at each of the antenna elements as a result of receiving the RF signal. For each of a plurality of pairs of antenna elements in the array, the difference in the number of integer cycles completed by the signal waveform in travelling to the different elements is determined. In addition, the difference in the phase of the received signal at the elements is observed. The number of integer cycles, the observed phase difference, and the spacing between the antenna elements are then applied to obtain a closed form solution of the angle of arrival of the incoming radio frequency signal relative to the plane of the planar array. Moreover, the relative angle to the source of the RF signal is computed directly.

In accordance with at least some embodiments of the present disclosure, an output can then be provided in the form of a relative azimuth angle, elevation angle, or azimuth and elevation angle from the planar array to the source or the apparent source of the received RF signal. In addition, in response to a determination of an angle of arrival of a signal, a receive pattern of an antenna can be steered or otherwise altered. Altering the beam pattern can include placing a desired signal within a beam of the pattern, or placing an undesired signal within a null of the pattern. Alternatively or in addition, a characteristic of a platform carrying or otherwise associated with the receiving system can be altered.

Additional features and advantages of embodiments of the disclosed systems and methods will become more readily apparent from the following description, particularly when taken together with the accompanying drawings.

DETAILED DESCRIPTION

Figure 1:
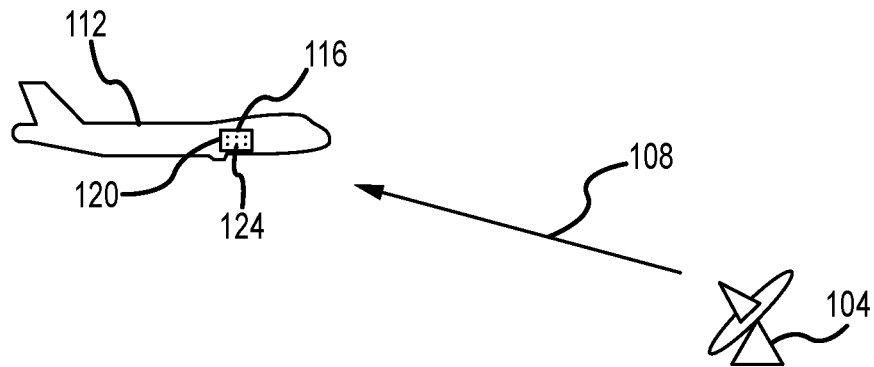
FIG. 1 depicts a source of a radio frequency signal and a platform associated with a radio frequency receiving system having an array of antenna elements in accordance with embodiments of the present disclosure.

FIG. 1 depicts a scenario in which a source or transmitter 104 is emitting a radio frequency (RF) signal 108 that is incident on a platform 112 associated with a radio frequency receiving system 116 in accordance with embodiments of the present disclosure. The RF receiving system 116 includes an array 120 of antenna or receiving elements 124. As discussed in greater detail elsewhere herein, the array 120 can be in the form of a one-dimensional or a two-dimensional array of antenna elements 124.

Figure 2:
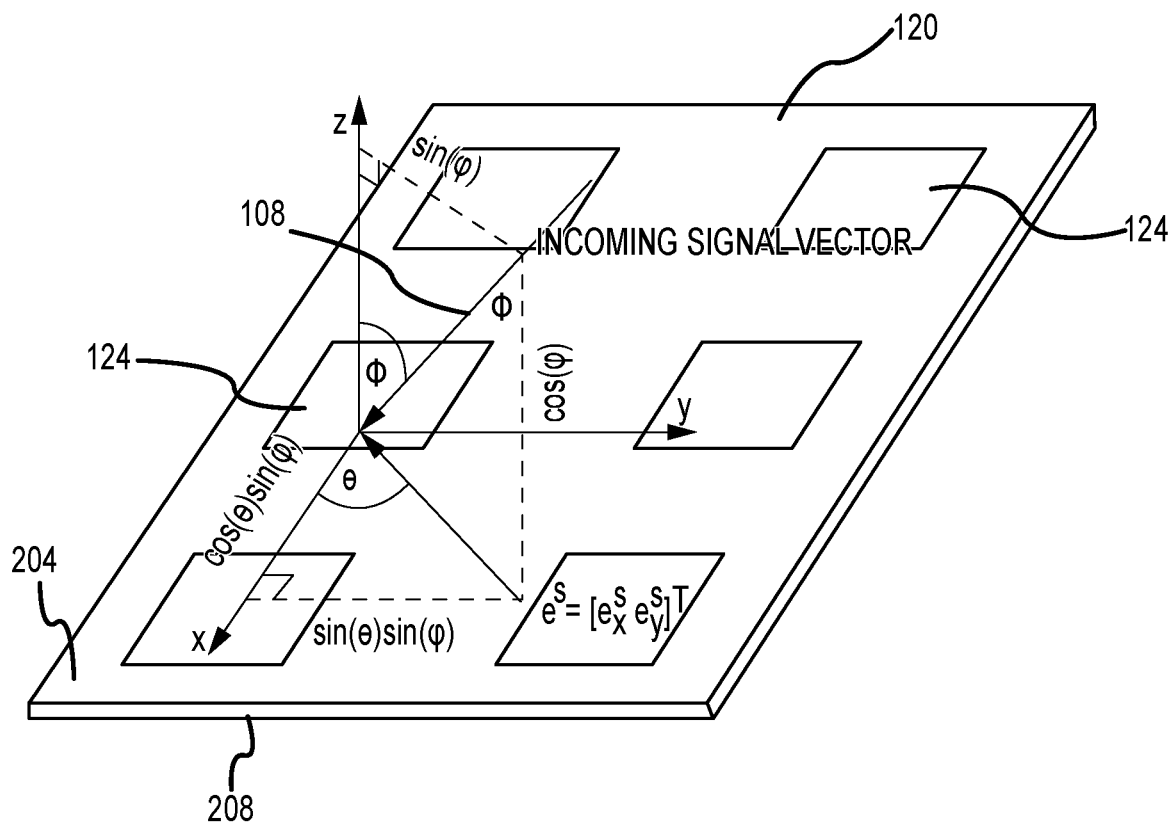
FIG. 2 depicts the azimuthal and elevational component vectors of a received signal.

As can be appreciated by one of skill in the art after consideration of the present disclosure, the received signal 108 has a vector relative to the receiving system 116 that can be expressed in terms of a first component vector having a magnitude and an azimuth angle, and a second component vector having a magnitude and an elevation angle. FIG. 2 depicts the azimuthal and elevational component vectors of an example received signal 108 relative to an array 120 associated with a receiving system 116 in accordance with embodiments of the present disclosure. In this example, the array 120 is a two-dimensional array of antenna elements 124 that lie within a common plane 204. The relative angle of arrival of the received signal 108 at the array 120 can be expressed as an azimuth angle $\theta$ and an elevation angle $\phi$. Moreover, so long as the received signal is not orthogonal to the common plane 204, the different antenna elements 124 will each receive the signal 108 at different points along the signal waveform. As a result, the phase of the signal 108 received at each of the antenna elements 124 will generally be different. This difference in phase can be sensed as a different complex voltage received at each of the antenna elements 124. Accordingly, as discussed herein, by determining the complex voltage, and from the complex voltage the different integer number of wavelengths that have occurred as the received signal 108 has passed to the different antenna elements 124 and the phase of the received signal 108 at the different antenna elements 124, the angle of the incoming signal 108 relative to a plane 128 of the array 120 can be determined.

Moreover, in accordance with at least some embodiments of the present disclosure, the antenna elements 124 used for angle of arrival determination can include a subset of a larger number of antenna elements 124 of an array 120 that is also used for other purposes, such as but not limited to transmitting or receiving communications, RADAR, or other RF signals. Alternatively, the array 120 may be utilized only for angle of arrival determination as described herein. In accordance with still further embodiments of the present disclosure, the antenna elements 124 used for angle of arrival determination can be disposed at irregular intervals within the array 120. Furthermore, the antenna elements 124 utilized for angle of arrival determinations as described herein can be a fixed or variable subset of the total number of antenna elements 124 within the array 120. For instance, different antenna elements 124 may be utilized in connection with the disclosed angle of arrival determination at different times, depending on an expected bearing to a signal source 104, or other criteria.

The array 120 may be formed on a planar substrate 208, with the antenna elements 124 on one side thereof. The substrate 208 may comprise a multiple layer printed circuit board (PCB) with multiple feed lines or other conductive elements formed therein. In addition, various electronic devices can be joined to the substrate 208. For example, discrete devices, integrated devices, electrical contacts, or the like can be placed on a side of the substrate 208 opposite the side on which the antenna elements 124 are placed.

Figure 3:
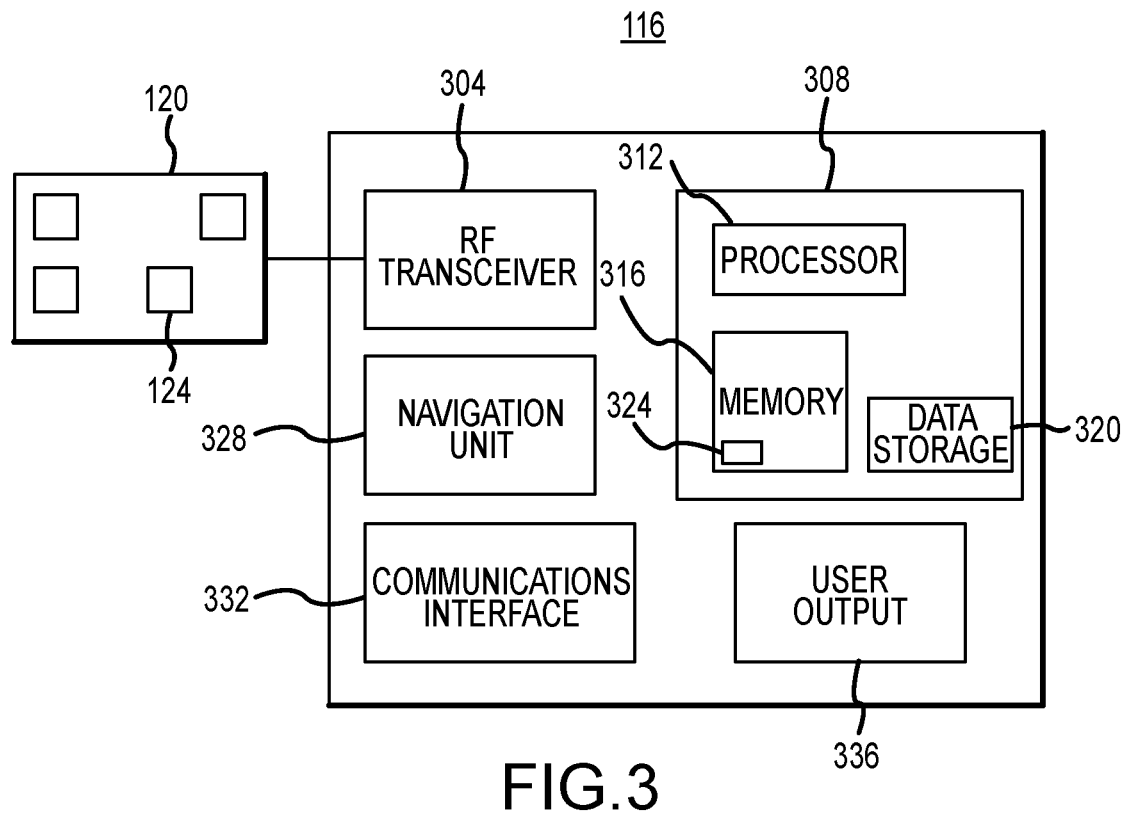
FIG. 3 depicts components of a radio frequency receiving system having an array of antenna elements in accordance with embodiments of the present disclosure.

FIG. 3 depicts components of an RF receiving system 116 having an array 120 of antenna elements 124 in accordance with embodiments of the present disclosure. Each of the antenna elements 124 is connected to a radio frequency transceiver 304. The RF transceiver 304 can include feed lines, filters, amplifiers, analog to digital converters (ADCs), and the like. As can be appreciated by one of skill in the art after consideration of the present disclosure, the RF transceiver 304 can implement RF receiver circuitry that provides an output that includes a complex-valued voltage measured at each element 124 of the array 120. In accordance with further embodiments of the present disclosure, the RF transceiver 304 can implement RF transmission circuitry, in addition to RF receiver circuitry.

The RF receiving system 116 also generally includes a processing block 308. The processing block 308 can include a processor 312, memory 316, and data storage 320. The processor 312 can include a general purpose programmable processor, a field programmable gate array (FPGA), a controller, or other device capable of executing instructions, for example included in software or firmware, for determining an angle of arrival of a received signal 108 as described herein. The instructions executed by the processor 312 can be stored in the memory 316 and/or the data storage 320. In accordance with embodiments of the present disclosure, the instructions are implemented as software code that includes an angle of arrival determination application 324 that can be executed by the processor 312 to implement an efficient angle of arrival determination system as described herein. The memory 316 can include a digital memory device for the short or long term storage of program instructions, intermediate data products, angle of arrival data, or the like. As examples, the memory 316 can include RAM, DRAM, SDRAM, or the like. The data storage 320 can include a digital memory device that, in addition or as an alternative to the memory 316, can store program instructions, intermediate data products, angel of arrival data, or the like. Examples of data storage 320 include hard disk drives (HDDs), flash memory or solid-state drives (SSDs), optical storage devices, or the like. In accordance with at least some embodiments of the present disclosure, multiple instances of memory 316 and/or data storage 320 components are included in the system 116.

In accordance with at least some embodiments of the present disclosure, a navigation unit 328 can be included as part of or operatively connected to the RF receiving system 116. The navigation unit 328 can be in the form of a global positioning system (GPS) receiver, an inertial navigation unit (INU), or the like. The navigation unit 328 can function to provide location information of the platform 112 carrying the RF receiving system 116. By referencing that location information, a determined angle of arrival of a received signal 108 can be used to provide a heading or a location, including but not limited to a geolocation, of a source 104 of the received signal 108.

The RF receiving system 116 can also include a communications or interface block 332. The interface block 332 can include one or more interfaces for supporting communications between the RF receiving system 116 and devices or systems that are co-located with or remote relative to the RF receiving system 116. For example, the interface block 324 can include a communications interface that provides output from the RF receiving system 116, including but not limited to a determined angle of arrival of a received signal 108 at the antenna array 120, to other systems or devices, directly or over a communications network. In accordance with further embodiments of the present disclosure, the interface block 332 can comprise a communications interface that receives instructions or data from other devices or systems, in addition to providing information including a determined angle of arrival to other devices and systems. In accordance with still other embodiments of the present disclosure, the RF receiving system 116 can include one or more output devices 336, such as but not limited to a display, speaker, or other output device. As can be appreciated by one of skill in the art after consideration of the present disclosure, entities receiving angle of arrival determination information from the RF receiving system 116 can use that information to point a beam produced by the array 120 at the source 104 of the signal 108, for instance to establish or enhance a communication channel between the array 120 or with other systems associated with the RF receiving system 116. As another example, the angle of arrival determination information provided by the RF receiving system 116 can be used to place the signal 108 in a null of a beam produced by the array 120 to reduce or eliminate interference, or for other purposes. As still another example, the angle of arrival determination information from the RF receiving system 116 can be used to operate the platform 112 relative to the signal 108 or the source 104, for instance to avoid the signal 108 or the source 104, or to engage or counteract the signal 108 or the source 104. Such operations can include maneuvers, launching countermeasures, recording signal characteristics, reporting signal characteristics to other entities, or other actions.

The RF receiving system 116 may be formed using integrated circuits, discrete components, or by interconnecting various subsystems, such as a processing block 308, a navigation unit 328, and an interface block 332 with one another and with an array 120 of antenna elements 124. In accordance with embodiments of the present disclosure, some or all of the various components or blocks may be formed, entirely or in part, on a side of a substrate 208 opposite a side of the substrate 208 on which the antenna elements 124 are formed.

Figure 4:
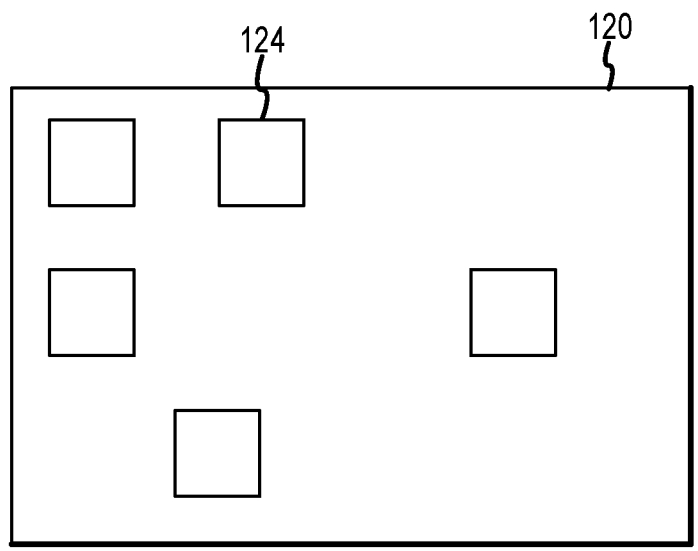
FIG. 4 depicts an example array of antenna elements in accordance with embodiments of the present disclosure.

FIG. 4 depicts an example array 120 of antenna elements 124 in accordance with embodiments of the present disclosure. In this example, the array 120 includes a two-dimensional array of antenna elements 124. In accordance with at least some embodiments of the present disclosure, no more than two of the antenna elements 124 are intersected by or lie on the same line. In accordance with other embodiments of the present disclosure, the elements 124 are arranged in multiple rows and multiple columns; however, as discussed in greater detail elsewhere herein, the antenna elements 124 used in connection with determining an angle of arrival of a received signal 108 are selected such that no more than two of those antenna elements 124 are intersected by or lie on the same line. In accordance with still further embodiments, and as shown in the illustrated example, the spacing between the elements 124 is arbitrary, with the spacing between at least some elements approximately equal to one half an expected received signal 108 wavelength, and with the spacing between other adjacent antenna elements 124 larger than one half the expected wavelength (e.g., equal to one wavelength or two times the wavelength). As can be appreciated by one of skill in the art after consideration of the present disclosure, the resolving power of a sparse array as illustrated in FIG. 4 can be as good or nearly as good as a normal array of regularly spaced antenna elements 124 arranged in rows and columns. In addition, by providing a sparse array the number of distinct signals and thus the amount of processing required is reduced. By providing a two-dimensional array, the relative angle of arrival of the received signal 108 can be determined in both azimuth and elevation. Alternatively, if the array 120 includes a one-dimensional array of antenna elements 124, the relative angle of arrival in terms of azimuth angle only can be provided. In accordance with further embodiments of the present disclosure, the array 120 may comprise a matrix of regularly spaced antenna elements 124 that can be operated in connection with the receipt or transmission of communication, remote sensing, or other signals, and a select number of the elements 124, for example at irregular intervals from one another, can be selected for purposes of determining an angle of arrival of a received signal 108.

In general, the different antenna elements 124 will each receive a different signal, so long as the received signal 108 is not orthogonal to the plane 128 of the array 120. More particularly, a received signal 108 that is incident on an array 120 will be detected as a different complex voltage at each of the antenna elements 124. As described herein, the difference in phase can be detected, and the difference in phase between a reference element 124 and other elements 124 within the array 120 can then be used, in combination with a determination of a difference in an integer number of wavelengths of the received signal 108 that have passed before that signal 108 is received at the different elements 124, to determine the angle of arrival of the received signal 108. In a conventional system, the angle of arrival is calculated by performing a search in angle-angle space for the solution. Unlike large maximum-likelihood searches over angle-angle-frequency space, MUSIC, and other 2D search intensive methods, the technique of embodiments of the present disclosure reduces the search space by only solving for the integer carrier-cycle ambiguity between the array elements. This greatly reduces the computational burden by requiring only a solution for the unit vector that points to the signal source impinging on the array.

Figure 5:
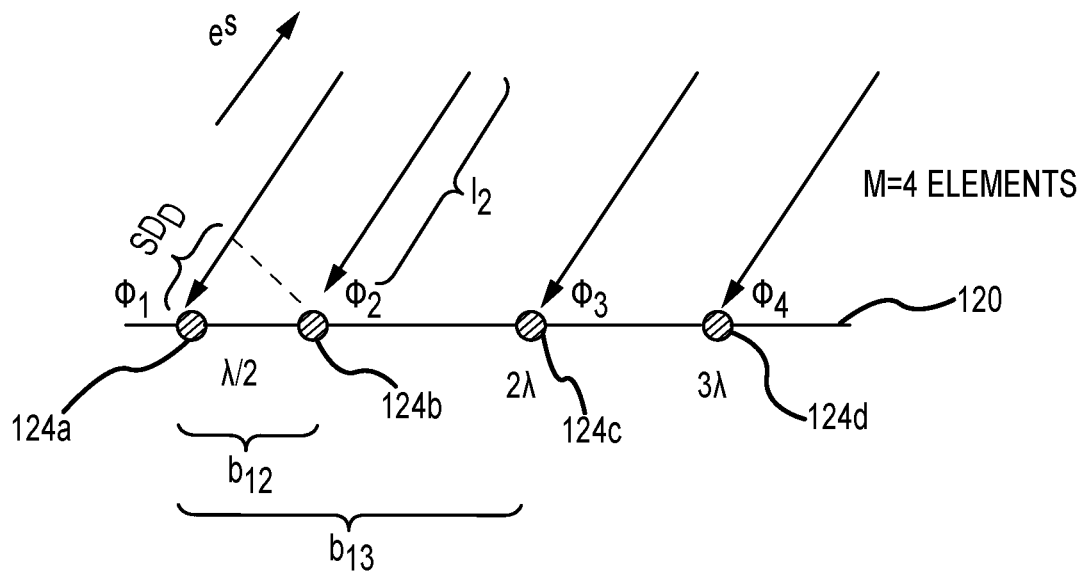
FIG. 5 depicts an incoming signal and a linear array of receiving elements in accordance with embodiments of the present disclosure.

More particularly, for a linear sparse array, the single differences between the first element and all others in the array can be expressed as follows:

$$(b_{1j} \cdot e^s) = \Delta d_{ij} = \left(\frac{\Delta \varphi_{ij}}{2\pi} + N_{ij}\right)\lambda, \; j = 2 \ldots M \qquad \text{Eq. 1}$$

where $b_{ij}$ is the difference vector between element coordinates i and j (baseline vectors), $e^s$ is a 2-D unit vector pointing in the direction of the signal source, $\Delta\varphi_{ij}=(\varphi_i-\varphi_j)$ is the phase difference between elements i and j, $N_{ij}$ is the difference in the elapsed number of integer wavelengths or carrier cycles of the incoming signal 108 between elements i and j, and $\lambda$ is the expected wavelength of the incoming signal (see FIG. 5).

This gives a (M−1) system of equations relating phase, baseline vectors, integer wavelengths, and the signal pointing vector, with two unknowns. For a planar array and signal angle of arrival (AOA), we want to solve for the vector $e^s=[e_x^s \; e_y^s]^T$. Thus for a 2-dimensional signal vector, we require a minimum of 3 equations for a least squares fit. Using more than 3 is possible, but this increases the computational load and search space. In units of distance, in matrix form, this can be expressed as follows:

$$\begin{bmatrix} b_{12x} & b_{12y} \\ b_{13x} & b_{13y} \\ b_{14x} & b_{14y} \end{bmatrix} \cdot \begin{bmatrix} e_x^s \\ e_y^s \end{bmatrix} = \begin{bmatrix} \Delta\varphi_{12} \\ \Delta\varphi_{13} \\ \Delta\varphi_{14} \end{bmatrix}\frac{\lambda}{2\pi} + \begin{bmatrix} N_{12} \\ N_{13} \\ N_{14} \end{bmatrix}\lambda \qquad \text{Eq. 2}$$

where $b_{ij(x,y)}=b_{i(x,y)}-b_{j(x,y)}$ is the element 124 spacing difference in (x,y) coordinates.

This equation can be solved by iterating over all possible integer N ambiguity combinations. In accordance with embodiments of the present disclosure, the array 120 geometry is used to bracket the number of cases to search over. In particular, the largest number of wavelengths traveled between any two elements 124 is governed by their Euclidean distance. For a linear array 120, the maximum number of integer wavelengths between element pairs occurs when an endfire signal impinges on the array. This will be the same as the Euclidean distance between element pairs in an arbitrarily spaced array. For example, in the linear array of FIG. 5, the spacing between the first element 124*a* and the second element 124*b* is such that the maximum number of integer wavelengths is zero, between the first element 124*a* and the third element 124*c* the maximum number of integer wavelengths is 2, and between the first element 124*a* and the fourth element 124*d* the maximum number of integer wavelengths is 3. Accordingly, the total search area is bracketed to $N_{12}=0$, $N_{13}=[-2,2]$, $N_{14}=[-3,3]$. Taking the Cartesian product gives all the possible combination vectors, and the total number of searches is 1(5)(7)=35. Accordingly, embodiments of the present disclosure allow the integer number of wavelengths to be searched to be reduced from the tens of thousands of points that must be analyzed using an angle-angle grid search method to, in this example, 35.

However, this does not enable the true solution to be identified from the candidate integer ambiguities in the N search space. In order to address this, we first rewrite the above equation (Eq 2) as follows:

$B \cdot e^s = \Delta d_N$, where $\Delta d_N = (\Delta\varphi/2\pi + N)\lambda$ is for a given N vector out of all the potential combinations. This set of equations can be solved via least squares, however this alone does not provide an identification of which $e^s$ vector computed over the different N combinations is correct. Writing Equation 2 in matrix form:

$$B \cdot e^s = \Delta d_N \qquad \text{(Eq. 3)}$$

and $$\Delta d_N = \left(\frac{\Delta\varphi}{2\pi} + N\right)\lambda$$

is the right side of Eq 2 for a given N vector out of all possible combinations. In accordance with embodiments of the present disclosure, QR factorization is leveraged to convert the B matrix above into a product of an orthonormal 3×3 matrix Q and a right triangular 3×2 matrix R, such that B=QR $$R = e^s = Q^T \Delta d_N$$

Expanded out, $$\begin{bmatrix} R_{11} & R_{12} \\ 0 & R_{22} \\ 0 & 0 \end{bmatrix} \begin{bmatrix} e^s_x \\ e^s_y \end{bmatrix} = \begin{bmatrix} Q_{11} & Q_{12} & Q_{13} \\ Q_{21} & Q_{22} & Q_{23} \\ q_1 & q_2 & q_3 \end{bmatrix} \begin{bmatrix} \frac{\Delta\varphi_{12}}{2\pi} + N_{12} \\ \frac{\Delta\varphi_{13}}{2\pi} + N_{13} \\ \frac{\Delta\varphi_{14}}{2\pi} + N_{14} \end{bmatrix} \lambda \qquad \text{(Eq. 4)}$$

This equation 4 can be split into two separate matrix equations (using the upper matrix and last row).

If we define $$R_u = \begin{bmatrix} R_{11} & R_{12} \\ 0 & R_{22} \end{bmatrix}, Q_u = \begin{bmatrix} Q_{11} & Q_{12} & Q_{13} \\ Q_{21} & Q_{22} & Q_{23} \end{bmatrix}, \text{ and } q = [q_1 \; q_2 \; q_3]$$

then:

$$R_u \cdot e^s = Q_u \cdot \Delta d_N \qquad \text{(Eq. 5)}$$

$$0 = q \cdot \Delta d_N \qquad \text{(Eq. 6)}$$

The $R_u$ matrix is known to be in the "estimation space" and the vector q is in "parity space" (left null space of B). That is, the q vector is orthogonal to the estimation space. Using QR factorization allows us to split the least squares problem into a solution and a residual (error) vector. As such, the least-squares solution vector is independent of the residual vector. We can use this fact to solve the above conundrum of not knowing which $e^s$ vector is correct from all possible trials of integer ambiguities. Note if the solution was exact, the parity equations in Eq 6 would equal zero. Typically this is not true for real signals with noise, so we take the minimum residual error as the best solution.

After QR factorization, we can now compute Eq. 6 over all candidate N vectors. For the above example, the total number of trials was 35. We then take the minimum error from the entire trial.

$$\min_N [|q \cdot \Delta d_N|] = N_{opt}$$

This minimum residual would correspond to a specific $$N_{opt} = \begin{bmatrix} N_{12} \\ N_{13} \\ N_{14} \end{bmatrix}$$

that gave the best fit. Using the corresponding N vector as the signal phase ambiguity solution (note we only solved for integer ambiguity differences between elements). We now have all the information necessary to solve the problem. Substituting $N_{opt}$ we can now solve Eq. 4 for $e^s$ $$e\hat{\;}s = (R\_u)\hat{\;}(-1) Q\_u (\Delta\varphi/2\pi + N\_opt)\lambda \qquad \text{(Eq. 7)}$$

or if $R_u$ is not square (for >3 equations), the common LS solution can also be computed from Eq. 3:

$$e\hat{\;}s = (B\hat{\;}T\, B)\hat{\;}(-1) B\hat{\;}T\, (\Delta\varphi/2\pi + N\_opt)\lambda$$

where $e^s$ is the best estimate of the signal pointing vector. Geometrically, FIG. 5 shows that the azimuth angle is effectively being solved independent of elevation angle, since the projection of the $e\hat{\;}s$ vector onto the X-Y plane rids of the elevation dependency. The corresponding azimuthal AOA estimate is simply $$\theta = \operatorname{atan2}\left(\frac{e^s_y}{e^s_x}\right)$$

and the elevation angle of arrival estimate can be determined using FIG. 2 also $$\varphi = \sin^{-1}\left(\sqrt{(e^s_y)^2 + (e^s_x)^2}\right)$$

In the linear 1D array case, the derivation is a bit different since the B matrix becomes singular. Hence we are unable to use the matrix method above. But for 2D planar arrays, the proposed matrix method is preferred.

Figure 6:
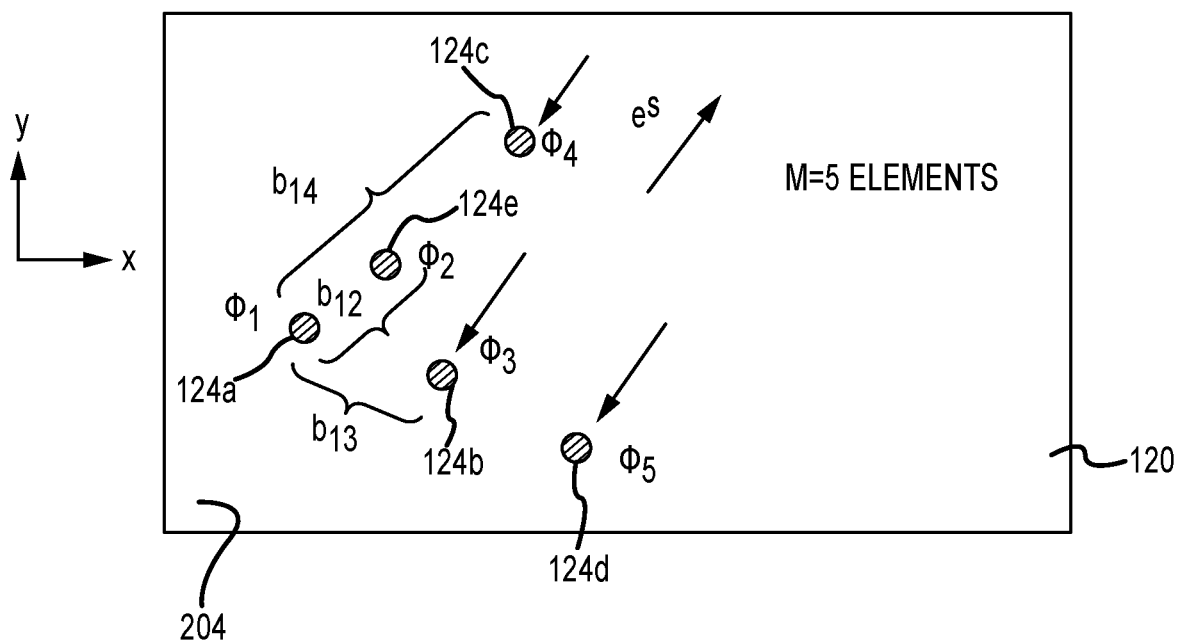
FIG. 6 depicts an incoming signal and a sparse 2D array of receiving elements in accordance with embodiments of the present disclosure.

FIG. 6 depicts a five antenna element 124, two-dimensional array 120 with arbitrary spacing between elements 124. Moreover, the antenna elements 124 lie in a common plane 204. In accordance with embodiments of the present disclosure, for an array with five or more antenna elements 124, a set of four elements 124 is selected for use in determining an angle of arrival of a received signal 108. This is because the $R_u$ matrix has two or more rows of zeros if more than four elements are used, which results in a parity space that is no longer unique, due to the fact that we are solving for a two-dimensional vector $e^s$. By selecting four elements 124, a 3×3 system is established, and ensures that the residual vector spans the entire null space and has a global least squares minimum. In accordance with at least some embodiments of the present disclosure, for an array 120 of 5 or more elements, an angle of arrival estimate is calculated for more than one of the possible 3×3 systems. Calculating an angle of arrival estimate using more than one 3×3 system can be used to provide a composite estimate with improved accuracy as compared to an estimate determined using just one of the possible systems. Notably, where estimates for more than one 3×3 system are determined, the integer ambiguities calculated between pairs of elements 124 that are present in different systems or sets of elements 124 can be reused, reducing the search space within which additional calculations need to be made.

In accordance with embodiments of the present disclosure, the Euclidean distance is used along with the X, Y distance to ensure an integer number of λ/2 spacing between element pairs. As an example, but without limitation, the elements 124 in the array of FIG. 6 that are used for purposes of angle of arrival determination are the first element 124a, at (X,Y) coordinate (0,0), the second element 124b at (X,Y) coordinate $((3/4)\lambda, (-\sqrt{7}/4)\lambda)$, the third element 124c, at (X,Y) coordinate $(\lambda, (\sqrt{5}/2)\lambda)$, and the fourth element 124d at (X,Y) coordinate $(2\lambda, (-3/2)\lambda)$. In this example, the fifth element 124e is not used. Accordingly, the λ/2 integer spacings for this array are 2, 3, 4, and 5.

Figure 7:
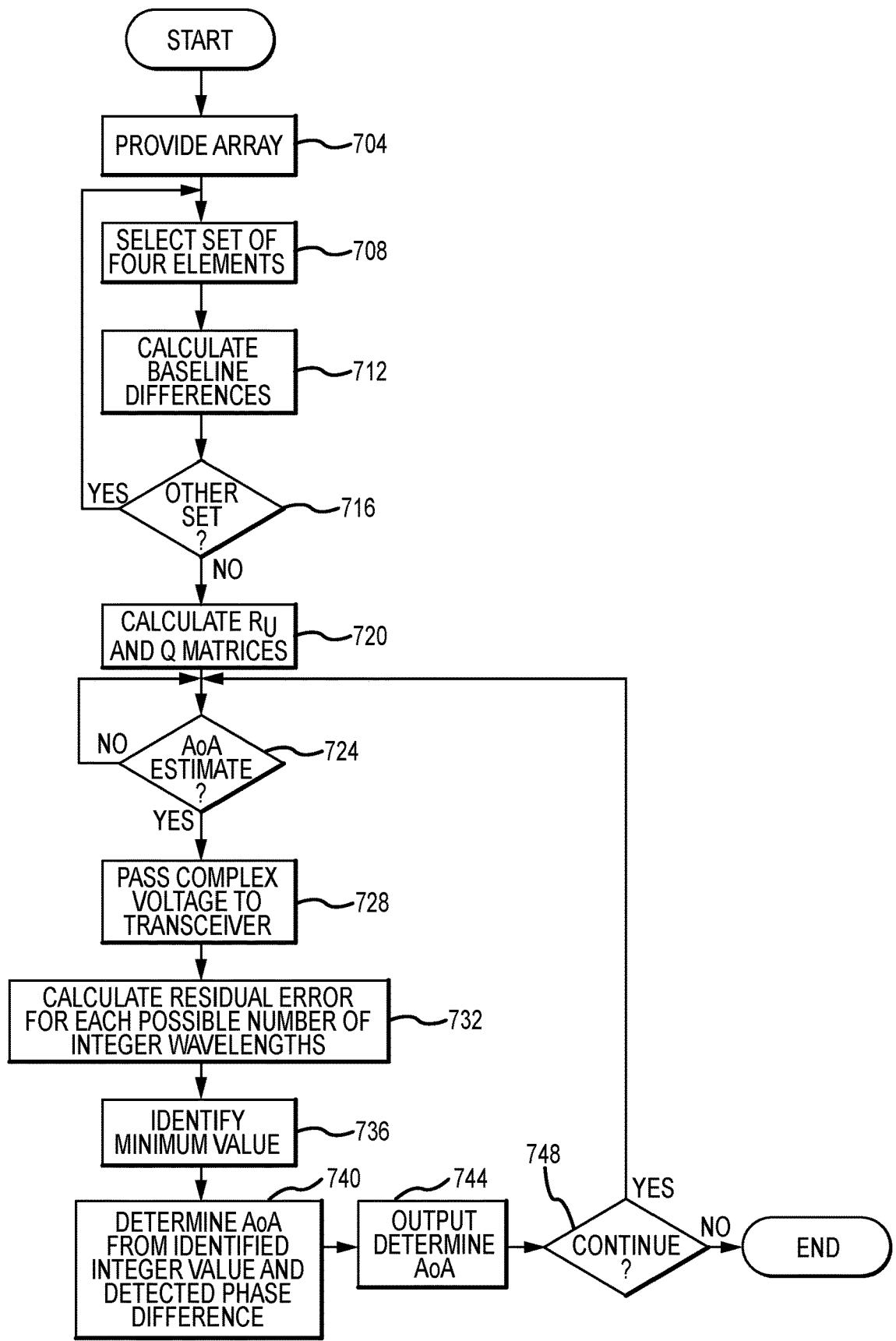
FIG. 7 is a flowchart depicting aspects of a process for determining an angle of arrival of a signal at a two-dimensional planar array antenna in accordance with embodiments of the present disclosure.

FIG. 7 depicts aspects of a method for determining an angle of arrival of a received RF signal in accordance with embodiments of the present disclosure. Initially, an array 120 having a plurality of antenna elements 124 is provided as part of or in connection with a receiving system 116 (step 704). A set of four of the elements 124 is then selected (step 708). A base line difference matrix, or B matrix, is then calculated for the selected set of antenna elements 124, and the results are stored in memory 316 (or data storage 320)(step 712). If the array 120 contains fewer than 5 elements, the baseline difference matrix for all the antenna elements 124 is calculated and stored. If other sets of antenna elements 124 are possible and are desired, for example to enable an angle of arrival estimate having a higher accuracy than if only a single set of antenna elements 124 was used (step 716), the process can return to step 708, and additional sets of elements 124 can be selected and the baseline differences between those elements 124 can be stored in memory. If no additional sets of antenna elements are possible and desired, the process continues to step 720, and the $R_u$ inverse and Q matrices are calculated and stored in memory 316 (or data storage 320)(step 720). Steps 704 through 720 can be performed before an angle of arrival estimation system 116 is made operational.

At step 724, a determination is made as to whether an angle of arrival of a received signal 108 is to be estimated. In accordance with at least some embodiments of the present disclosure, the determination as to whether an angle of arrival of a received signal 108 is to be determined may simply be whether an RF signal is detected at one or more of the antenna elements 124. If it is determined that an angle of arrival of a received signal 108 is to be estimated, the complex voltage present at at least some of the antenna elements 124 can be passed from the antenna elements 124 to an RF transceiver 304 (step 728). The RF transceiver 304 can operate to transform the complex voltage received at each of the antenna elements 124 into a digital value.

The digital value is then used to determine the estimated angle of arrival of the received signal 108. More particularly, for each of the antenna element 124 pairs, the maximum number of integer wavelengths of a received signal 108 of a given wavelength that can have passed between the elements 124 is known and has previously been stored in memory. That is, the maximum spacing between elements 124 in terms of the integer number of wavelengths of the carrier signal is known. For each of these integer values, and for each selected pair of antenna elements 124, a residual error is calculated (step 732). The minimum residual values obtained from the different possible integer values for each of the selected element 124 pairs are then identified (step 736). The identified integer value, plus the detected phase difference, maps to a location of the signal source 104 by angle, which is obtained by applying the obtained value to a least squares fit (step 740). Where multiple sets of antenna elements 124 have been selected, an angle of arrival solution for each set can be calculated and combined (e.g. averaged) with other solutions, to obtain a final angle of arrival value. Alternatively or in addition, angle of arrival solutions for the same or different sets of antenna elements 124 obtained at different times can be combined. The determined angle of arrival can then be provided as an output (step 744).

A determination can then be made if operation of the RF receiving system 116 to determine an angle of arrival of a received signal 108 should be continued (step 748). If operation is to be continued, the process can return to step 724. Otherwise the process can end.

In response to the determination of an angle of arrival by the receiving system 116, a signal can be output to indicate that a received signal 108 has been detected. Moreover, that signal can include information that includes or that is derived from the determined angle of arrival of the received signal 108. For example, in a radar warning implementation, a direction to a source 104 of the signal 108 can be indicated by the RF receiving system 116. In a communications scenario, such as a 5G cellular communications system or a satellite communications system, where the signal 108 is a desired signal, a beam of a communications antenna can be steered to point at a source 104 of the signal 108 based on or in response to the angle of arrival determination made by the RF receiving system 116. Where the signal 108 is an undesired or interfering signal, angle of arrival information provided by the RF receiving system 116 can be used to steer the beam of a communications or other antenna to place a source 104 of the signal 108 in a null of the antenna beam. As can be appreciated by one of skill in the art after consideration of the present disclosure, the antenna used for communications or otherwise can be separate from an array 120 used for determining the angle of arrival of the received signal 108. In accordance with other embodiments of the present disclosure, the elements 124 of the array 120 used in determining the angle of arrival of the received signal 108 can be elements that are also used in the communications or other functions of the antenna. For example, the elements 124 used for angle of arrival determination by an RF receiving system 116 as disclosed herein can be disposed within a larger array 120 of elements 124. Moreover, where the elements 124 are part of a larger array 120, whether that array 120 is specially provided for angle of arrival determinations or for additional purposes, the elements 124 selected for use as part of an angle of arrival determination can be changed based on the known or expected wavelength of the signal 108, the expected bearing to the source 104, a region of interest, time, or other criteria.

In accordance with at least some embodiments of the present disclosure a spacing between adjacent antenna elements 124 is arbitrary. Moreover, the spacing between at least some adjacent antenna elements is $\lambda/2$ or greater, where $\lambda$ is the center wavelength of the received signal 108. In accordance with further embodiments of the present invention, the spacing between adjacent antenna elements is irregular. Moreover, the number of antenna elements 124 can vary. For example, in a system 116 implementing radar warning receiver, the number of elements 124 may be four. As another example, in a 5G communications system base station, an array may contain a relatively large number of elements, for instance 256, to enable precise pointing of a beam, and to support multiple beams simultaneously. In a system with a relatively large number of antenna elements 124, the system 116 may utilize one or more sets of antenna elements Embodiments of the present disclosure have application in the field of electrical engineering and phased array design. The disclosure covers a novel system and process for computing the angle of arrival of an incoming radio frequency (RF) electromagnetic wave or signal impinging on a planar antenna array. The array 120 geometry can have sparse or arbitrary spacing between antenna elements 124. The technique requires less computations than other phase interferometry methods.

Embodiments of the present disclosure can be used in a 5G MIMO transmit array for tracking of multiple receivers for optimal beam placement. Furthermore, embodiments of the present disclosure can be used in a SATCOM system where acquisition of a satellite signal is necessary before a narrow tracking beam can be placed in angle-angle space. For example, the AOA determination can be used to acquire signals firstly using a broader beam or with omnidirectional antenna elements.

Further embodiments of the present disclosure can also be used in a RADAR-warning receiver that computes the angle of arrival of a threat RADAR impinging on the receive array 120. Embodiments of the present disclosure are fast enough to easily compute AOA for every received pulse from the threat RADAR, even when the RADAR has a high pulse-repetition frequency (PRF) like those in a fire-control system.

Unlike 1D linear arrays, the 2D array of embodiments of the present disclosure enables both azimuthal and elevation angles of a received RF signal 108 to be determined, without the cone angle discrepancy as seen in 1D uniform linear arrays (ULAs). This approach also employs a novel processing technique to determine the differential unknown number of integer carrier cycles due to the impinging RF wave on the array, which turns out to be a function of element-to-element geometric distance.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
   receiving a radio frequency (RF) signal at a system that includes an array of receiving elements, wherein a spacing between adjacent receiving elements is known;
   for each receiving element in a plurality of the receiving elements, transforming by a radio frequency transceiver a complex voltage present at each of the plurality of the receiving elements to a cliental value;
   from the digital values, a processor:
      determining a difference in an integer number of cycles of the received RF signal between each of a plurality of pairs of the receiving elements and a source of the received signal;
      determining a phase difference in the signal as received between each of the plurality of pairs of the receiving elements;
      determining an angle of arrival of the received RF signal relative to the array of receiving elements from the determined differences in the integer number of cycles and the determined phase difference; and
      outputting the determined angle of arrival.

2. The method of claim 1, further comprising:
   forming a beam, wherein a characteristic of the beam is selected based on the determined angle of arrival of the received signal.

3. The method of claim 2, wherein the characteristic of the beam is a null, and wherein the null is positioned to correspond to the determined angle of arrival of the received signal.

4. The method of claim 2, wherein the characteristic of the beam includes a beam lobe, and wherein the beam lobe is positioned to correspond to the determined angle of arrival of the received signal.

5. The method of claim 4, wherein the characteristic of the beam further includes a width of the beam lobe, and wherein in response to determining the angle of arrival of the received signal the beam width is reduced.

6. The method of claim 1, further comprising:
   determining a location of the system at a time the received signal is received.

7. The method of claim 6, wherein in response to determining the angle of arrival of the received signal and a location of the system at the time the received signal is received a source of the received signal is geolocated.

8. The method of claim 1, wherein a spacing between each of the receiving elements in the pairs of receiving elements is different.

9. The method of claim 8, wherein four receiving elements are used to define three pairs of receiving elements.

10. The method of claim 1, further comprising:
    in response to determining an angle of arrival of the received signal, steering an antenna beam.

11. A system for determining an angle of arrival of an electromagnetic wave, comprising:
- a two-dimensional array of antenna elements, wherein a spacing between adjacent antenna elements is known, and wherein the antenna elements lie in a first plane;
- a radio frequency transceiver, wherein the radio frequency transceiver is operably connected to each of the antenna elements in the two-dimensional array of antenna elements; and
- a processor, wherein the processor is operable to execute instructions to determine an angle of arrival of an incident radio frequency signal in azimuth and elevation relative to the first plane based on an integer difference in a number of cycles completed by the incident radio frequency signal in travelling from a source to different antenna elements of the array of antenna elements and based on a phase difference of the incident radio frequency signal at the different antenna elements of the array of antenna elements.

12. The system of claim 11, wherein the two-dimensional array of antenna elements includes at least four antenna elements.

13. The system of claim 12, wherein the difference in the integer number of cycles completed by the incident radio frequency signal and the phase difference in the incident radio frequency signal as received is determined between each of the at least four antenna elements.

14. The system of claim 12, wherein the array of antenna elements is a sparse array.

15. The system of claim 12, wherein a spacing between the antenna elements of the array is irregular.

16. The system of claim 11, wherein the two-dimensional array includes more than four antenna elements, and wherein the difference in the integer number of cycles completed by the incident radio frequency signal and the phase difference in the incident radio frequency signal as received is determined between only three pairs formed from four of the antenna elements.

17. The system of claim 12, wherein a maximum distance between any two antenna elements of the four antenna elements is twice a first selected wavelength.

18. The system of claim 12, wherein no more than two of the four antenna elements are intersected by a single line.

19. The system of claim 11, wherein the instructions include:
- instructions to determine a maximum number of integer wavelengths of a wavelength of interest that can occur between antenna elements for at least three pairs of antenna elements;
- instructions to determine a residual error for each of the possible number of different integer wavelengths between the antenna elements for the at least three pairs of antenna elements; and
- instructions to determine a phase difference between the antenna elements for the at least three pairs of antenna elements.

20. The system of claim 11, further comprising:
- an output, wherein at least one of an angle of arrival or information derived from an angle of arrival is communicated to a user.

* * * * *

UNITED STATES PATENT AND TRADEMARK OFFICE
CERTIFICATE OF CORRECTION

| | |
|---|---|
| PATENT NO. | : 11,169,240 B1 |
| APPLICATION NO. | : 16/700334 |
| DATED | : November 9, 2021 |
| INVENTOR(S) | : James M. Shima |

It is certified that error appears in the above-identified patent and that said Letters Patent is hereby corrected as shown below:

In the Claims

In Claim 1, Column 12, Line 22, please delete "cliental" and insert --digital--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*